W. S. HOWELL.
FEEDING DEVICE.
APPLICATION FILED JAN. 25, 1911.

1,017,758.

Patented Feb. 20, 1912.
2 SHEETS—SHEET 2.

Witnesses

William S. Howell,
Inventor
by C. A. Snow & Co.
Attorneys

UNITED STATES PATENT OFFICE.

WILLIAM S. HOWELL, OF TROY, NEW YORK.

FEEDING DEVICE.

1,017,758.   Specification of Letters Patent.   Patented Feb. 20, 1912.

Application filed January 25, 1911. Serial No. 604,666.

*To all whom it may concern:*

Be it known that I, WILLIAM S. HOWELL, a citizen of the United States, residing at Troy, in the county of Rensselaer and State of New York, have invented a new and useful Feeding Device, of which the following is a specification.

It is one object of this invention to provide a feed box of novel and improved construction, which may be readily mounted in a stall structure, to constitute a part of the same, the feed box being so constructed that the amount of fodder supplied to the animals, may be regulated at will.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

Figure 1:
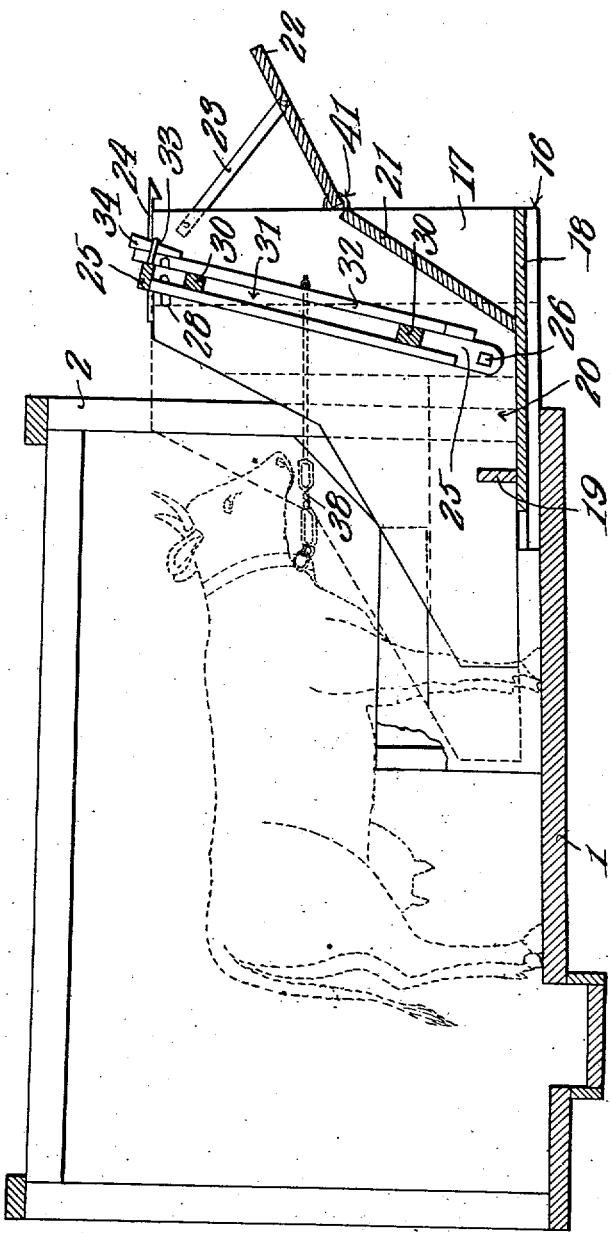
Figure 2:
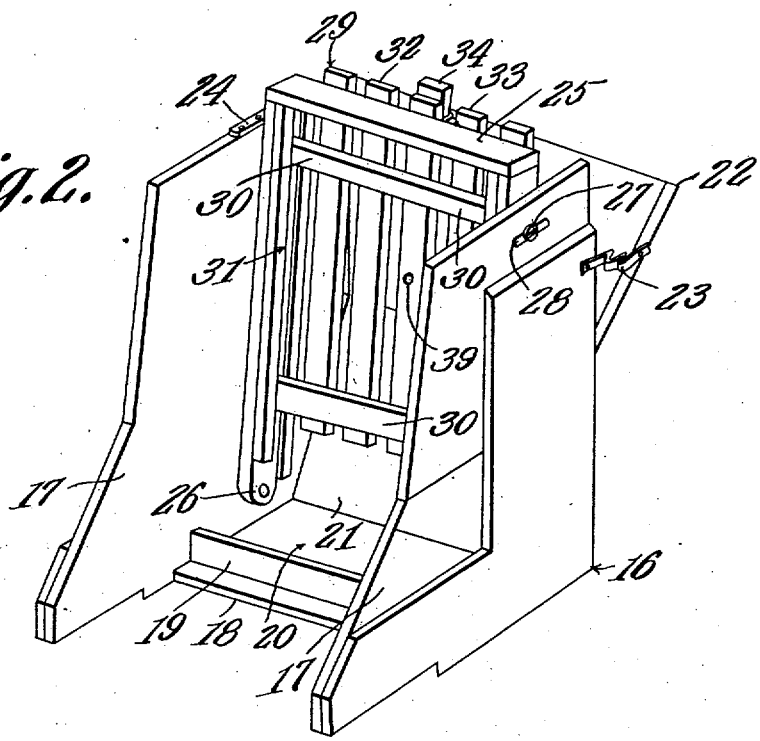

In the drawings,—Figure 1 is a vertical longitudinal section of a stall structure, in which the feed box hereinafter described, is mounted, the feed box being partly withdrawn from the stall structure; and Fig. 2 is a detail perspective of the feed box.

In the drawings, a portion of a stall structure is shown, and in the present instance, the said stall structure embraces a floor 1 and upright members 2.

The feed box is shown in clearest detail in Fig. 2 of the drawings, the feed box being denoted generally by the numeral 16. The feed box is adapted to be slid into place within the stall, between the upright frame members 2, the feed box being held in place in any desired manner.

The feed box 16 comprises side walls 17 and a bottom 18, there being an upright partition 19 resting upon the bottom, the partition being extended into terminal abutment with the side walls, thereby to define the feed trough proper 20. Mounted in inclined position between the side walls 17 of the feed box, and extended downwardly into contact with the bottom thereof, is a chute 21. A closure 22 for the rear end of the feed box is provided, the closure being hinged adjacent its lower edge, to the side walls of the feed box, as shown at 41. The closure may be disposed in inclined position, as shown in Fig. 1, and under such circumstances, the closure is prevented from falling too far downwardly, by means of flexible elements 23 which unite the closure with the side walls 17 of the feed box. When the closure is swung upwardly from the position shown in Fig. 1, so as to close the rear end of the feed box, the closure may be retained in position by a resilient latch 24, secured at one end to one of the side walls of the feed box, and at the other end adapted to hook over the upper edge of the closure.

Disposed transversely within the feed box 16, in front of the chute 21, is a frame 25, pivoted adjacent its lower end, as shown at 26, to the side walls 17 of the feed box. Upon its pivotal mounting 26, the frame 25 may be tilted into various positions, the tilting of the frame being limited by securing members 27, adjustably mounted in the frame 25, in alinement with the frame and moving in slots 28 in the side walls 17 of the feed box.

The invention further includes an open work rack, denoted by the numeral 29, and mounted for vertical reciprocation in the frame 25. This rack 29 preferably includes spaced cross bars 30, terminally engaged for sliding movement in guide ways 31 formed in the frame 25, the rack further including upright, spaced slats 32, secured to the cross bars 30. These slats 32 may be spaced apart, at any desired distances.

In order to hold the rack 29 in various positions of vertical adjustment upon the frame 25, an arcuate member, ordinarily a staple 33, is terminally mounted in the upper portion of the frame 25, so as to inclose one of the slats 32 of the rack 29. Between the intermediate portion of the staple 33 and the rear face of the slat 32 which is inclosed by the staple, a wedge 34 may be seated, the construction obviously being such that when the wedge 34 is driven home, the rack 29 will be held in any position to which it may have been adjusted. A halter 38, of any desired construction, may be united with the rack 29, one end of the halter, if desired, being extended through an opening 39, formed in one of the slats 32 of the rack 29.

By lifting the latch 24, the closure 22 will be permitted to drop downwardly into the inclined position shown in Fig. 1, whereupon the fodder may readily be thrown into the feed trough 20, the fodder sliding downwardly along the chute 21, to rest against the rack 29. By raising and lowering the rack 29 in the frame 25, in the manner hereinbefore described, the space between the bottom of the rack and the floor 18 of the feed box may be adjusted, thus preventing the waste of fodder. Moreover, by reason of the fact that the frame 25 is tiltable upon its pivotal mountings 26, the amount of fodder held between the frame upon the one hand, and the chute 21 and the closure 22 upon the other hand, may be regulated. Obviously, the tilting of the frame 25 serves to alter the inclination of that face of the frame which is presented toward the animal in the stall.

Recalling that in Fig. 1, the feed box 16 is shown as partially withdrawn from the stall structure, it will be obvious that a removable feed box is provided, which may be slid in place into a stall, already constructed, to be subsequently secured within the stall, in any desired manner.

Owing to the fact that the guides 31 are open at their lower ends, as clearly shown in Fig. 2, the slidable rack 30—32 may be lowered into engagement with the bottom 18 of the feed box. Since the securing members 27 project from the rack 30—32 in alinement with the rack, and register in the slots 28, the members 27, in addition to their functions as means for holding the rack at adjusted angles, also coöperate with the pivot elements 26 in supporting the rack. The arcuate member 33 and the wedge 34 coöperate with the guides 31 in supporting the rack 30—32 for vertical sliding movement, the elements 33 and 34 also forming a simple and effective means for holding the rack against vertical sliding movement. Since the ends of the cross bars 30 register slidably in the guides 31, one of the slats 32 will be maintained in vertical alinement with the arcuate member or staple 33, so that when the rack is slid upwardly, this slat will enter the arcuate member, for engagement by the wedge 34. It is to be noted, moreover, that the upper cross bar 30 is engageable by the top of the tiltable frame, to limit the upward sliding movement of the rack.

Having thus described the invention what is claimed is:—

A device of the class described comprising side walls, one of which is provided with a slot; a frame located between the side walls and pivoted at its lower end to the side walls, the frame having guides in its sides, which guides open through the lower ends of the frame; a securing member movable in the slot and adjustably mounted in the frame, in alinement with the frame to hold the upper end of the frame in adjusted positions; a rack comprising cross bars terminally mounted to slide in the guides, one bar being engageable by the upper end of the frame to limit the upward movement of the rack, and slats secured to the cross bars, the slats being upwardly extended above the upper end of the frame, and bearing against the rear edge of the frame; an arcuate member inserted into the upper end of the frame, and surrounding one of the slats, thereby to form a means, auxiliary to the guides, for guiding the rack in its sliding movement; and a wedge insertible between the arcuate member and said slat, whereby to bind all of the slats against the rear edge of the frame.

In testimony that I claim the foregoing as my own, I have hereto affixed my signature in the presence of two witnesses.

WILLIAM S. HOWELL.

Witnesses:
P. F. CAHILL,
RUTH H. BARRETT.

---

Copies of this patent may be obtained for five cents each, by addressing the "Commissioner of Patents, Washington, D. C."